UNITED STATES PATENT OFFICE 2,526,213

PROCESS FOR PRODUCTION OF MESITYLENE

Wolford M. Ewalt, Niagara Falls, N. Y., assignor to the United States of America as represented by the United States Atomic Energy Commission No Drawing. Application November 8, 1943, Serial No. 509,505

8 Claims. (Cl. 260—671)

The present invention relates to a process for the manufacture of mesitylene.

More particularly, the present invention relates to an improved process for the manufacture of mesitylene by reacting toluene and anhydrous methanol in the presence of a Friedel-Crafts reaction catalyst, and preferably an aluminum chloride catalyst.

Heretofore, the manufacture of mesitylene has generally been effected by polymerization processes. Thus, both allylene and acetone have been polymerized to give relatively small yields of mesitylene.

In the Journal of the American Chemical Society 60, 1421 (1938), James F. Norris and John N. Ingraham describe a process for the production of mesitylene from toluene and anhydrous methanol in the presence of anhydrous aluminum chloride in which one-half the quantity of toluene to be employed is first placed in a reactor together with the anhydrous aluminum chloride. The mixture is then cooled in an ice bath to a temperature of about 10° to 15° C. and the balance of the toluene and the anhydrous methanol added thereto. The ice bath is replaced by an oil bath and heating of the mass carried out at a temperature of about 108° to 110° C. After removal of the aluminum chloride addition compounds by pouring the reaction mass on a mixture of ice and hydrochloric acid, the crude mesitylene is separated by steam distillation. The crude product is then sulphonated in order to eliminate any unreacted toluene, the product steam distilled and fractionated. A yield of about 70% is said to be obtained. However, on attempting to duplicate the above process of Norris and Ingraham, I have been able only to obtain yields of about 40 to 50%. Apparently the procedure employed by Norris and Ingraham so moderates the condensation between toluene and anhydrous methanol that it does not even approach completion.

An object of this invention is to provide a process for the manufacture of mesitylene from toluene and anhydrous methanol in high yield.

In accordance with the present invention I have found, that if the full theoretical quantities of toluene and anhydrous methanol, necessary for the production of mesitylene, are mixed together and the mixture cooled slightly it can then be added to the Friedel-Crafts reaction catalyst and complete control of the reaction be retained.

As a specific example of the present invention I prepare a mixture of two mols of anhydrous methanol and one mol of toluene, which mixture is cooled to a temperature of about 10° to 15° C. This mixture is added gradually to two mols of aluminum chloride, meanwhile agitating and cooling to remove the heat of reaction and maintain the temperature of the mass at about 10° to 15° C.

The product of this reaction is largely 1, 2, 4 trimethyl benzene (pseudocumene). In order to bring about a rearrangement of the methyl groups to 1, 3, 5 trimethyl benzene (mesitylene), after the above toluene-methanol mixture has been added to the aluminum chloride in the manner described, I add another two mols of aluminum chloride thereto, preferably by increments, with stirring. The reaction mixture is then heated to a suitable temperature, for example, about 108° to 110° C. with refluxing and maintained thereat for a period of from two to four hours and preferably for three hours. The reaction mixture is then allowed to cool and poured over ice and hydrochloric acid to break up the aluminum chloride addition compounds in accordance with the procedure usual in Friedel-Crafts reactions. The final reaction is shown by the following equation:

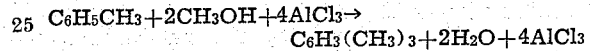

$$C_6H_5CH_3 + 2CH_3OH + 4AlCl_3 \rightarrow C_6H_3(CH_3)_3 + 2H_2O + 4AlCl_3$$

Upon standing the products of the reaction separate into two layers with the aluminum chloride in the aqueous layer. The hydrocarbon may be separated by decantation, but it preferably is recovered by distillation.

In the process of the present invention the reaction substantially goes to completion, there being substantially no loss from volatilization of the reagents. If preferred, the reaction mixture may be maintained in a closed reactor during the heating step, in which case a slight superatmospheric pressure will develop.

Although I have given the proportions of the reagents as theoretical, I do not wish to be limited thereto, as a slight excess in one or the other will merely involve a subsequent easy separation; moreover, although the proportion of Friedel-Crafts reaction catalyst may be varied, it is preferred that the catalyst be employed in molecular excess over the reacting components. An essential feature of my process is the addition of the reagents in substantially theoretical proportions directly to the catalyst, with cooling, instead of dilution, at the start of the process in order to moderate the reaction and keep it under control.

Although in the above example aluminum chloride is the only Friedel-Crafts catalyst indicated, I do not wish to be limited thereto as other catalysts, such as ferric chloride and boron trifluoride are known to be more or less effective in bringing about condensation reactions.

Although I have described a preferred embodiment of my invention, numerous modifications in the details thereof may be made without departing from the spirit of the invention. Accordingly, the following claims are intended to embrace all such modifications as come within their scope.

What is claimed is:

1. A process for the manufacture of mesitylene comprising mixing substantially theoretical quantities of toluene and anhydrous methanol required for the production of mesitylene, cooling said mixture to a temperature within the range of substantially 10° to 15° C., then adding the cooled mixture to a quantity of Friedel-Crafts reaction catalyst in molecular excess over the reacting components in said mixture, heating the reaction mass, and separating the mesitylene so formed.

2. A process for the manufacture of mesitylene comprising mixing quantities of toluene and anhydrous methanol in substantially the stoichiometric proportions required for the production of mesitylene, cooling said mixture to a temperature of substantially 10° to 15° C., then associating the cooled mixture with a quantity of an aluminum chloride catalyst in molecular excess over the reacting components, then heating the reaction mass to a temperature of about 108° to 110° C., and separating the mesitylene so formed.

3. A process for the manufacture of mesitylene comprising mixing substantially one molecular proportion of toluene and substantially two molecular proportions of anhydrous methanol, cooling said mixture to a temperature of substantially 10° to 15° C., adding said cooled mixture to substantially two molecular proportions of an aluminum chloride catalyst, then adding an additional two molecular proportions of aluminum chloride catalyst thereto, then heating the reaction mass to a temperature of about 108° to 110° C., and separating the mesitylene so formed.

4. In a process for the manufacture of mesitylene by the reaction effected by means of contacting an admixture of toluene and anhydrous methanol with a Friedel-Crafts reaction catalyst, the improvement which comprises cooling said admixture to a temperature within the range of substantially 10° to 15° C. prior to contacting with Friedel-Crafts catalyst, and thereupon, with the admixture within said temperature range, effecting said contacting with Friedel-Crafts reaction catalyst.

5. In a process for the manufacture of mesitylene by the reaction effected by means of contacting an admixture of toluene and anhydrous methanol with a Friedel-Crafts reaction catalyst, the improvement which comprises cooling said admixture to a temperature within the range of substantially 10° to 15° C. prior to contacting with Friedel-Crafts reaction catalyst, and thereupon, with the admixture within said temperature range, effecting said contacting with the Friedel-Crafts reaction catalyst while maintaining the reacting system at a temperature within the range of substantially 10° to 15° C.

6. In a process for the manufacture of mesitylene by the reaction effected by means of contacting a prepared admixture of toluene and anhydrous methanol with a Friedel-Crafts reaction catalyst, the improvement which comprises preparing said admixture by mixing the toluene and anhydrous methanol in substantially the stoichiometric proportions required for the production of mesitylene, cooling said admixture to a temperature within the range of substantially 10–15° C. prior to contacting with Friedel-Crafts reaction catalyst, and thereupon, with the admixture within said temperature range, effecting said contacting with Friedel-Crafts catalyst while maintaining the reacting system at a temperature within the range of substantially 10° to 15° C. by cooling to remove the heat of reaction, and thereafter heating the reaction mass.

7. In a process for the manufacture of mesitylene by the Friedel-Crafts reaction effected by means of contacting a prepared admixture of toluene and anhydrous methanol with an aluminum chloride catalyst, the improvement which comprises preparing said admixture by mixing the toluene and anhydrous methanol in substantially the stoichiometric proportions required for the production of mesitylene, cooling said admixture to a temperature within the range of substantially 10–15° C. prior to contacting with aluminum chloride catalyst, and thereupon, with the admixture within said temperature range, effecting said contacting with aluminum chloride catalyst while maintaining the reacting system at a temperature within the range of substantially 10° to 15° C. by cooling to remove the heat of reaction.

8. In a process for the manufacture of mesitylene by the Friedel-Crafts reaction effected by means of contacting a prepared admixture of toluene and anhydrous methanol with an aluminum chloride catalyst in molecular excess over the reacting components in said admixture, the improvement which comprises preparing said admixture by mixing the toluene and anhydrous methanol in substantially the stoichiometric proportions required for the production of mesitylene, cooling said admixture to a temperature within the range of 10° to 15° C. prior to contacting with aluminum chloride catalyst, thereupon, with the admixture within said temperature range, effecting said contacting with aluminum chloride catalyst while maintaining the reacting system at a temperature within the range 10–15° C. by cooling to remove the heat of reaction, thereafter adding an additional quantity of aluminum chloride catalyst to the reaction system, heating the reaction mass to substantially 108° to 110° C., and separating the mesitylene so formed.

WOLFORD M. EWALT.

REFERENCES CITED

The following references are of record in the file of this patent:

Thomas: "Anhydrous Aluminum Chloride in Organic Chemistry," pub. Reinhold Pub. Co., New York (1941), pages 616, 617, 618, 619 (4 pages).